Patented June 6, 1939

2,161,524

UNITED STATES PATENT OFFICE 2,161,524

DIHYDROBENZOCARBAZOLE COMPOUNDS

Heinrich Morschel, Cologne-Deutz, and Otto Goll, Leverkusen-I. G. Werk, Germany, assignors to General Aniline Works, Inc., New York, N. Y., a corporation of Delaware No Drawing. Application February 13, 1933, Serial No. 656,623. In Germany February 18, 1932

6 Claims. (Cl. 260—315)

The present invention relates to new dihydrobenzocarbazole compounds, more particularly it relates to compounds which may be represented by the general formula:

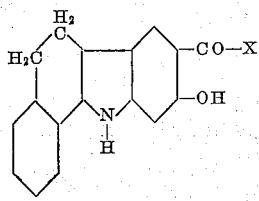

wherein X stands for the radical of a non-sulfonated and non-carboxylated arylamine.

Those compounds in which X stands for a hydroxy group are obtainable according to the synthesis of Kolbe by causing carbondioxide to act upon an alkali metal salt of 2-hydroxy-5,6-dihydro-7,8-benzocarbazole, or upon the 2-hydroxy-dihydrobenzocarbazole in the presence of an alkali metal carbonate at superatmospheric pressure and at elevated temperature.

Our new compounds are obtainable by reacting with the corresponding primary aromatic or heterocyclic amine free from a sulfonic acid or a carboxylic acid group, such as an amine of the benzene, naphthalene or carbazole series, upon the chloride or an ester of the 2-hydroxy-5,6-dihydro-7,8-benzocarbazole-3-carboxylic acid in an inert solvent, such as nitrobenzene, at elevated temperature and in the presence of an acid- or water-binding agent, or by causing the free carboxylic acid to act upon the isocyanic acid ester of the corresponding amine. The preferred method of preparing our new arylamides resides in dissolving the carboxylic acid and the amine in an inert organic solvent, adding thereto phosphorus oxychloride or phosphorus trichloride, and heating, which process is more fully described in the examples.

The 2-hydroxy-5,6-dihydro-7,8-benzocarbazole-3-carboxylic acid used as starting material in the present invention is obtainable for example, by starting with such a 5,6-dihydro-7,8-benzocarbazole as is substituted in the 2-position by a substituent which easily can be transformed into a hydroxy group, transforming the said substituent in the 2-position into the hydroxy group according to known methods, for example, in case of an amino group by diazotizing and boiling according to the method of Sandmeyer, in case of a sulfonic acid group by melting with a caustic alkali and in case of an alkoxy group by treating with a desalkylating agent, such as aluminium chloride, and introducing the carboxylic acid group into the 3-position by causing carbon-dioxide to act upon an alkali metal salt of 2-hydroxy-5,6-dihydro-7,8-benzocarbazole at superatmospheric pressure and at elevated temperature.

The new carboxylic acid arylamides are generally yellowish colored substances, insoluble in water, soluble in dilute aqueous alkalies and in organic solvents. They are valuable intermediate products in the manufacture of azo-dyestuffs. These arylamides are especially valuable as coupling components when producing azo dyestuffs by the methods usually used for producing ice colors. These arylamides can be used in much the same way as the 2,3 hydroxycarbazole carboxylic acid arylamides of French Patent No. 684,682.

The invention is illustrated by the following examples, without being limited thereto, the parts being by weight:

*Example.*—10 parts of 5,6-dihydro-7,8-benzocarbazole-2-sodium sulfonate are mixed with 15 parts of powdered caustic potash, and the mixture is molten at 270° C. to 280° C., until the starting sulfonic acid can no more be detected. After cooling, the melt is dissolved in water and filtered from insoluble by-products. On acidifying the filtrate, the 2-hydroxy-5,6-dihydro-7,8-benzocarbazole is precipitated in a crystalline form. It is easily soluble in hot alcohol and has the melting point of 183° C.

A mixture of 1 part of the 2-hydroxy-5,6-dihydro-7,8-benzocarbazole and 3 parts of potash is heated for about 10 hours at a temperature of 260° C. and under a carbondioxide pressure of 50 atmospheres. The reaction mass is dissolved in water; after cooling, the solution is rendered acid to Congo with hydrochloric acid, the precipitate is filtered with suction and washed with water. Then it is dissolved in hot dilute aqueous soda solution. The solution is filtered, acidified, and the yellowish colored 2-hydroxy-5,6-dihydro-7,8-benzocarbazole-3-carboxylic acid of the formula:

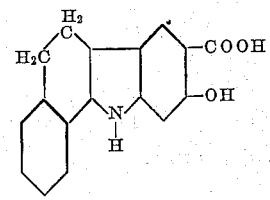

precipitate is filtered, washed with water and dried. It forms alkali metal salts which are rather soluble in cold water, easily soluble in hot water. The free acid begins to decompose at 220° C., thereby splitting off carbondioxide.

279 parts of 2-hydroxy-5,6-dihydro-7,8-benzocarbazole-3-carboxylic acid are heated to 80° C. in 2000 parts of toluene with 140 parts of 4-anisidine. To this mixture there are added in the course of 1 hour 70 parts of phosphorus trichloride, and after this, the reaction mass is refluxed, until hydrochloric acid does no more escape. After cooling, soda is added, the toluene is blown off with steam and the 2-hydroxy-5,6-dihydro-7,8-benzocarbazole-3-carboxylic acid-p-anisidide of the formula:

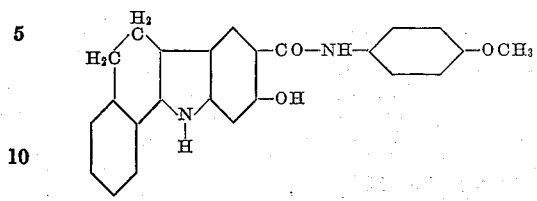

is filtered with suction, washed with hot water and dried. After recrystallizing it shows the melting point of 251° C.

In an analogous manner 2-hydroxy-5,6-dihydro-7,8-benzocarbazole-3-carboxylic acid yields a 2'-methyl-4'-anisidide of the melting point 234° C., having the following formula:

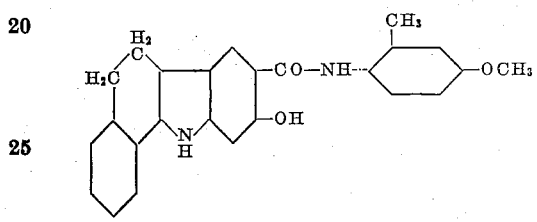

a 2'-chloroanilide of the melting point 237° C., a 4'-chloroanilide of the melting point 264° C., a 2'-toluidide of the melting point 247° C., having the following formula:

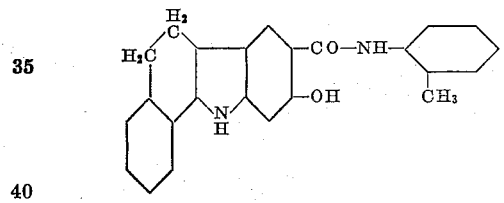

a 3'-nitranilide, a 2'-naphthylamide, and a 2'-carbazolylamide of the melting point above 300° C.

We claim:

1. The compounds of the general formula:

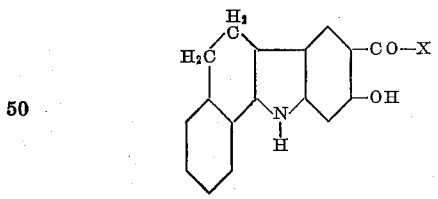

wherein X stands for the radical of a non-sulfonated and non-carboxylated arylamine, being generally yellowish substances, insoluble in water, soluble in dilute aqueous alkalies and in organic solvents, and being valuable intermediate products in the manufacture of dyestuffs.

2. The compounds of the general formula:

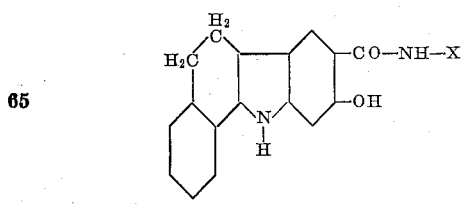

wherein X stands for a non-sulfonated and non-carboxylated radical of the benzene or naphthalene series, being generally yellowish substances, insoluble in water, soluble in dilute aqueous alkalies and in organic solvents, and being valuable intermediate products in the manufacture of dyestuffs.

3. The compounds of the general formula:

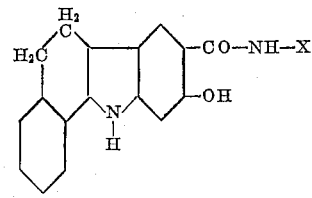

wherein X stands for a radical of the group consisting of phenyl, naphthyl, and alkyl-, alkoxy-, halogen-, and nitro-substituted phenyl and naphthyl radicals, being generally yellowish substances, insoluble in water, soluble in dilute aqueous alkalies and in organic solvents, and being valuable intermediate products in the manufacture of dyestuffs.

4. The compound of the formula:

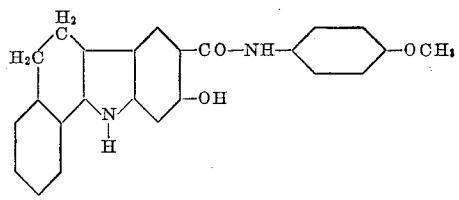

being a yellowish crystalline substance of the melting point 251° C., soluble in dilute aqueous alkalies and in organic solvents, and being a valuable intermediate product in the manufacture of dyestuffs.

5. The compound of the formula:

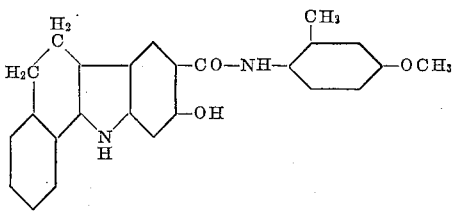

being a yellowish crystalline substance of the melting point 234° C., soluble in dilute aqueous alkalies and in organic solvents, and being a valuable intermediate product in the manufacture of dyestuffs.

6. The compound of the formula:

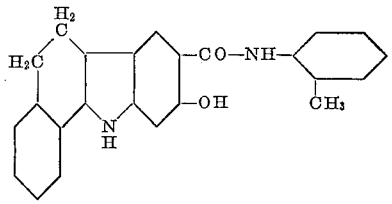

being a yellowish crystalline substance of the melting point 247° C., soluble in dilute aqueous alkalies and in organic solvents, and being a valuable intermediate product in the manufacture of dyestuffs.

HEINRICH MORSCHEL.
OTTO GOLL.